Sept. 9, 1941.  A. J. TYDELSKI, JR  2,255,370
FRONT END SUSPENSION FOR VEHICLES
Filed Feb. 12, 1941
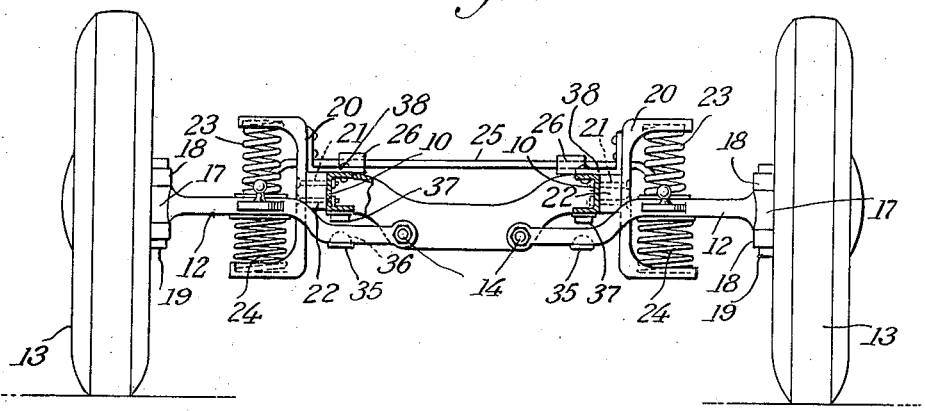
Fig. 1.
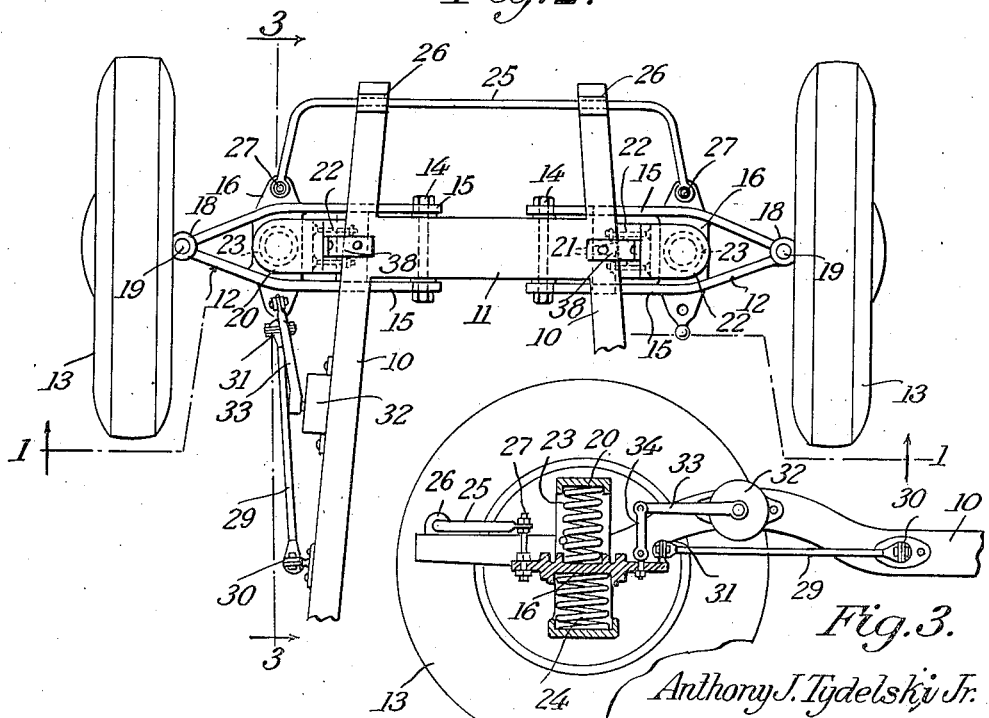
Fig. 2.
Fig. 3.
Anthony J. Tydelski Jr.
INVENTOR
BY Victor J. Evans & Co.
ATTORNEYS
WITNESS Patented Sept. 9, 1941

2,255,370

UNITED STATES PATENT OFFICE 2,255,370

FRONT END SUSPENSION FOR VEHICLES

Anthony J. Tydelski, Jr., Alexander, N. Y.

Application February 12, 1941, Serial No. 378,629

3 Claims. (Cl. 267—20)

This invention relates to a front end suspension for vehicles and has for an object to provide a suspension which will include a single axle section for each front wheel cushioned between an upper helical spring and a lower helical spring carried by a yoke which is rigidly secured to the chassis of the vehicle, the lower spring being relatively larger but shorter than the upper spring, and the upper spring having greater tension than the lower spring to permit the weight of the vehicle being supported by the upper spring which cushions the body of the vehicle against down thrust shocks, while the lower spring functions to cushion the body against up thrust shocks, thus combining in two simple springs and a single axle section the advantageous cushioning of a vehicle body heretofore accomplished only by intricate lever systems which are prone to get out of order and quickly become worn out.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a cross sectional view of a vehicle chassis showing a front end suspension construction in accordance with the invention, the section being taken on the line 1—1 of Figure 2.

Figure 2 is a plan view of the front end suspension.

Figure 3 is a detail longitudinal sectional view taken on the line 3—3 of Figure 2.

Referring now to the drawing in which like characters of reference designate similar parts in the various views, 10 designates the side chassis bars and 11 the front cross member of a motor vehicle chassis, these parts being usually formed of channel material rigidly connected together. The front end suspension comprising the subject of this invention includes an axle section 12 for each front ground wheel 13, pivotally secured at the inner end to the cross member 11 by pivot bolts 14 passed through the member and through spaced legs 15 of the axle section, as best shown in Figure 2. The legs of the axle section extend along the front and rear sides of the cross member and outside of the adjacent side bar 10 are fixed, in any preferred manner, to a spring supporting plate 16 which extends parallel with the longitudinal median line of the vehicle. Beyond the plate, the legs converge to, and are connected together by, a barrel 17 through which and the usual upper and lower bearings 18 of the spindle of the ground wheel 13, a pin 19 is passed to form a vertical axis of rotation upon which the wheel turns during the steering operation.

A yoke 20 is disposed in vertical position between the legs 15 of the axle section and is rigidly secured to the adjacent side bar 10 of the chassis by bolts 21 passed through the vertical member of the yoke and through a spacing block 22 which is interposed between the yoke and the side bar.

A helical spring 23 is seated on top of the spring supporting plate 16 and is confined under compression against the bottom side of the upper horizontal leg of the yoke. A helical spring 24 is seated on the bottom side of the plate 16 and is confined under compression between the plate and the upper side of the lower horizontal leg of the yoke. The lower spring 24 is of relatively larger diameter, and is shorter than the upper spring 23, the latter, however, has greater strength to support the weight of the vehicle body which, as is customary, is disposed upon the upper horizontal legs of the yokes. The lower spring cushions the vehicle body against shocks due to down thrusts, as when the ground wheel 13 drops into a depression, while the upper spring cushions the body against up thrust shocks due to the ground wheel passing over a bump.

A front stabilizer, comprising a resilient steel shaft 25 is mounted to turn in bearings 26 on the front ends of the chassis side bars 10 and is bent rearwardly at the outer ends and connected to the front ends of the spring supporting plates 16 of both ground wheels by bolts 27, shown best in Figure 3.

An additional stabilizer 29 may be used, the same having a ball and socket connection 30 with one of the chassis side bars 10 and having a ball and socket connection 31 with the rear end of one of the spring supporting plates 16.

A conventional shock absorber 32 is secured to the just mentioned side bar 10, and the lever arm 33 thereof is connected by a link 34 to the rear end of the just mentioned spring supporting plate 16.

The legs 15 of each axle section 12 are connected together under the respective side bar 10 by a plate 35, having fixed to its upper face a rubber bumper 36. Secured to the bottom flange of the side bar is a rubber bumper 37 adapted to contact with the bumper 36 when the axle section 12 rocks excessively, and cushion the parts against breakage by direct metal to metal contact.

Right angular braces 38 are fixed in any preferred manner to the yokes 20 and to the front cross member 11 of the vehicle frame to reinforce the yokes against displacement.

Since the operation of the parts has been described as the description of the parts progressed, it is thought the invention will be fully understood without further explanation.

What is claimed is:

1. A front suspension for vehicles comprising, a chassis side bar, a chassis cross member rigidly secured to the side bar, an axle section pivotally secured at one end to the cross member, a ground wheel on the free end of the axle member, a plate secured to the axle member extending parallel with the longitudinal median line of the vehicle outside of the chassis side bar, a yoke having an upright intermediate portion rigidly secured to the side bar and having upper and lower parallel legs extending over the plate, an upper helical spring seated on the plate and confined under compression against the lower side of the upper leg of the yoke, a lower helical spring seated on the plate and confined under compression against the upper side of the lower leg of the yoke, and a resilient stabilizing shaft mounted to turn in a bearing on the front end of the chassis side bar and having a rearwardly directed outer end connected to said plate.

2. The structure as of claim 1 and in which the lower spring is relatively larger in diameter and shorter than the upper spring, while the upper spring has greater strength than the lower spring.

3. The structure as of claim 1 and in which the axle section comprises parallel legs extending along the front and rear sides of the cross member and beyond the plate the legs converge to and are connected to the ground wheel.

ANTHONY J. TYDELSKI, Jr.